United States Patent [19]

Graham et al.

[11] Patent Number: 4,534,384

[45] Date of Patent: Aug. 13, 1985

[54] REEL SYSTEM FOR AXIALLY EXTENDING HOSE

[75] Inventors: Frank C. Graham, Sykesville; James T. Parker, II, Woodbine, both of Md.

[73] Assignee: Flight Refueling, Inc., Columbia, Md.

[21] Appl. No.: 449,863

[22] Filed: Dec. 15, 1982

[51] Int. Cl.³ .............................................. B64D 37/00
[52] U.S. Cl. .............................. 137/899.2; 137/355.2; 137/355.26; 244/135 A; 242/86
[58] Field of Search .......... 137/355.2, 355.26, 355.22, 137/355.27, 899.2; 242/86; 244/135 A

[56] References Cited

U.S. PATENT DOCUMENTS

| 344,554 | 6/1886 | Weygont | 137/355.2 |
|---|---|---|---|
| 2,301,208 | 11/1942 | Gear | 137/355.2 |
| 2,595,655 | 5/1952 | Honnay | 137/355.2 |
| 2,599,423 | 6/1952 | Ziegler | 242/86 |
| 2,669,483 | 2/1954 | Fletcher | 242/86 |
| 2,774,547 | 12/1956 | Latimer-Needham et al. | 244/135 A |
| 2,879,017 | 3/1959 | Smith | 244/135 A |
| 2,954,190 | 9/1960 | Le Clair | 244/135 A |
| 2,973,171 | 2/1961 | Ward et al. | |
| 2,995,321 | 8/1961 | Zeitler | 244/135 A |
| 3,272,453 | 9/1966 | Hallock | 242/86 |

FOREIGN PATENT DOCUMENTS

| 58901 | 3/1924 | Sweden | 242/86 |
|---|---|---|---|
| 18396 | of 1897 | United Kingdom | 137/355.2 |

OTHER PUBLICATIONS

ARS, Aerial Refueling System, Technical Report, vol. II, Fairchild Republic Co., Long Island, NY, 1982.

*Primary Examiner*—A. Michael Chambers
*Attorney, Agent, or Firm*—Schwartz, Jeffery, Schwaab, Mack, Blumenthal & Evans

[57] ABSTRACT

The hose reel comprises a supply hose having an inlet end and an outlet end, and a drum mounted for rotation about a central axis and having an outer surface for receiving the supply hose. The inlet end is connected to the drum and a sheave is provided for wrapping the supply hose around the drum outer surface as it rotates. The sheave is moved axially along the drum as it rotates.

1 Claim, 3 Drawing Figures

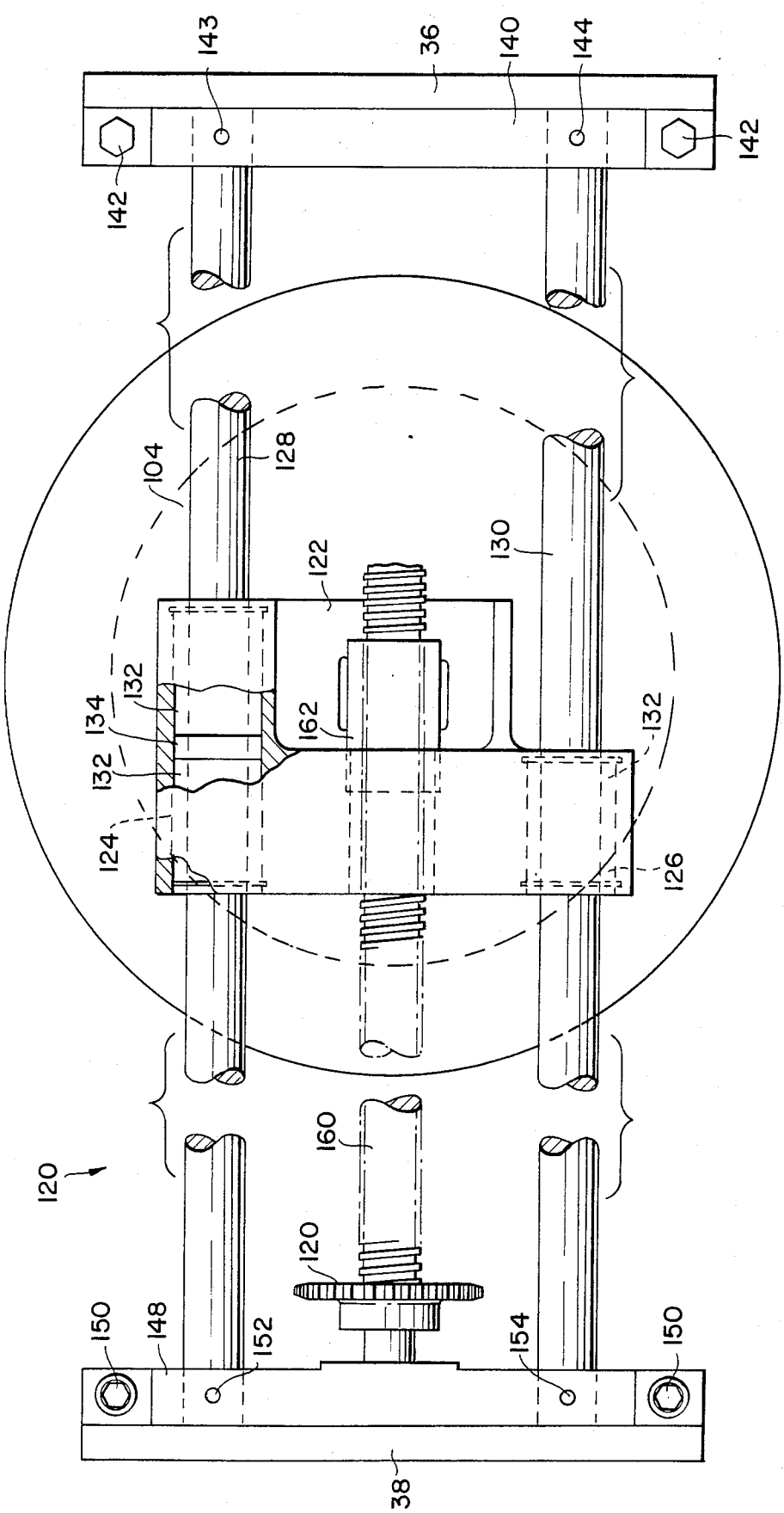

REEL SYSTEM FOR AXIALLY EXTENDING HOSE

BACKGROUND OF THE INVENTION

1. Field of the Invention

This invention relates to systems for refueling aircraft while in flight and especially to reel systems for use in an aircraft refueling apparatus.

2. Discussion of Related Art

In many instances, it is desirable to reduce the time of flight of an aircraft by refueling the craft while in flight and thus avoiding the necessity of landing, refueling and taking off again. In order to facilitate such in-flight refueling, systems have been developed which can be attached to a tanker plane for coupling to an aircraft to be refueled.

A conventional system for providing aircraft-to-aircraft coupling is in the form of a module or pod which can be connected to the bottom of the plane to be used as a tanker. The pod contains a tank filled with aircraft fuel to be transferred to the other aircraft. Also, the pod contains a hose with an attachment mechanism for engagement with the aircraft fuel tank of the other plane. A reel is also contained in the pod for unwinding the hose prior to refueling and rewinding the hose into the pod after the refueling operation has been completed. In such a conventional design, the hose wraps circumferentially about the reel and extends tangentially from the reel in a direction transverse to the reel axis. In order to accommodate a sufficient length of hose to reach an aircraft to be refueled, the hose on such a transverse reel must be wrapped in layers, and several layers of hose must be provided. In order to ensure that the lower layers of a hose wrapped on such a transverse reel are not crushed by the outer layers, the hose wrapping must include convolutions. This leads to a relatively complicated reel design which is expensive to manufacture, difficult to perform stress analysis on, and expensive to produce. Additionally, a transverse reel has the disadvantage that the pod in which the reel is mounted must be made relatively wide to include the entire reel within it. This leads to a relatively larger than desirable pod structure and can also increase the overall weight of the structure.

Alternately, the reel can be incorporated inside a plane designed as a tanker for refueling purposes.

SUMMARY OF THE INVENTION

An object of the present invention is to provide an axial hose reel for use in an aircraft refueling pod which reel is relatively uncomplicated and has a relatively small number of moving parts.

A further object of the present invention is to provide a hose reel for use in an aircraft refueling pod which reel has a fixed hose load point which makes the stress analysis of the reel relatively uncomplicated and permits the support structure design to be relatively easy.

A further object of the present invention is to provide a hose reel for use in an aircraft refueling pod which incorporates one wrap of hose on a rotating drum in order to reduce chafing and wear on the hose. The use of a single wrap design also eliminates the need for convolutions of the hose on the drum because there is no need to compensate for possible crushing of lower layers of hose as is the case when a plurality of layers are used on a single drum.

Yet another object of the present invention is to provide a reel for use in an aircraft refueling system which is relatively easy to manufacture, can be produced at a relatively low cost due to the simplicity of its design, and is relatively easy to maintain and operate.

Another object of the present invention is to provide a reel for use in an aircraft refueling system which reel can be fitted into a relatively small area so as to permit the overall size of the pod in which the reel is used to be reduced significantly from that conventionally used.

Yet a still further object of the present invention is to provide a reel for use in an aircraft refueling system which permits larger hose to be installed and therefore permits higher fuel transfer rates to be attained thereby increasing the efficiency of the entire refueling operation.

In accordance with the above and other objects, the present invention comprises a supply hose having an inlet end and an outlet end. A drum is mounted for rotation about a central axis and has an outer surface for receiving the supply hose when the supply hose inlet end is connected to the drum and the supply hose is wound about the outer surface. A means for rotating the drum for wrapping the supply hose around the outer surface is provided and a feed means is connected for operation in synchronism with the rotating means for feeding the supply hose axially of the drum toward or away from the drum in accordance with the direction of rotation of the drum.

The feed means includes a sheave having an axis of rotation perpendicular to the axis of the drum. The sheave has an outer surface with a groove which receives the supply hose to change the direction of the supply hose from transverse of the drum to axially of the drum. The feed means also includes means for moving the sheave axis axially of the drum in response to the rotation of the drum.

A guide member is mounted alongside the drum and the sheave is mounted for movement along the guide member. The means for moving the sheave in response to rotation of the drum is mounted alongside the guide member and includes a threaded shaft which is received in a threaded collar mounted to the sheave.

A collar having an opening aligned axially of the drum is mounted at one end of the drum and the hose is threaded therethrough after it extends from the sheave.

In accordance with other aspects of the invention, in a module for use in refueling aircraft, which module includes a storage tank for fuel, an outlet from the tank to permit fuel to flow from the tank, a pump for pumping fuel from the storage tank, and a hose for distributing the fuel to an aircraft, a reel system for winding and unwinding the hose is provided. The reel system includes a drum mounted for rotation about an axis and has an outer surface for receiving the hose. A rotary coupling connects the hose to the outlet. The coupling is mounted to the drum. A means for rotating the drum is provided and a means for feeding the hose onto and off of the drum as it rotates is provided for changing the direction of the hose.

The feeding means comprises a sheave mounted for rotation about an axis of rotation perpendicular to the drum axis. The sheave has an outer recessed surface for receiving the hose and changing the direction of the hose from transverse to axially of the drum. A means for moving the sheave axially along the drum is connected to the drum and operates synchronously with the drum as the drum rotates. The sheave moving means comprises a guide rail extending along the drum and a threaded shaft extending parallel to the guide rail. A sleeve mounted to the drum receives the guide rail and a nut mounted to the sheave receives the threaded shaft.

BRIEF DESCRIPTION OF THE DRAWINGS

FIG. 3 is a top plan view of the sheave and sheave guide mechanism of the present invention.

DETAILED DESCRIPTION OF THE PREFERRED EMBODIMENT

Figure 1:
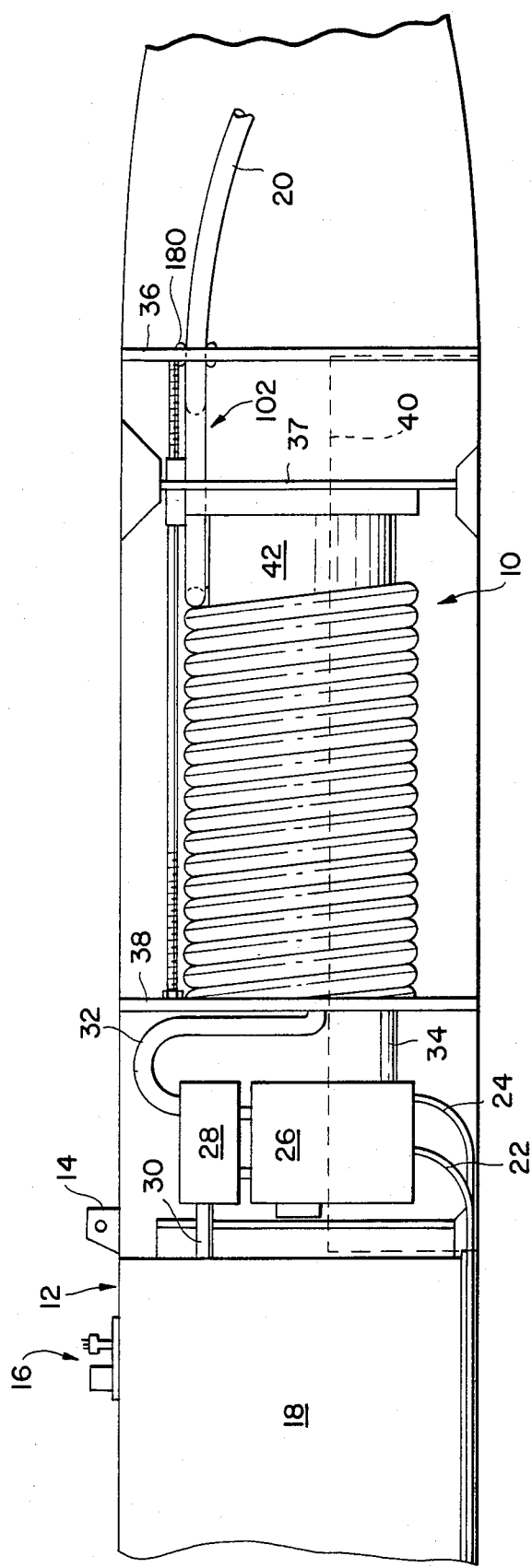
FIG. 1 is a part fragmentary view of a refueling pod incorporating a hose reel according to the present invention.

FIG. 1 shows a hose reel assembly 10 mounted in an aircraft refueling pod 12. Pod 12 is of a conventional design with a pair of attachment lugs, one of which is shown at 14 for connecting the pod to the belly of a tanker aircraft. Electrical connections of the pod to the aircraft are made through connector 16. The forward portion of pod 12 includes a tank 18 in which fuel to be dispensed is stored and a fuel supply hose 20 extends into the rear of pod 10 and contains a coupling (not shown) for attachment to an aircraft to be refueled. Hose 20 extends out of an appropriate opening (not shown) formed in the aft end of pod 12. Pod 12 may also be supplied with a power source such as a ram air turbine mounted on the forward end of the pod (not shown) and connected to provide hydraulic pressure through lines 22 and 24 to drive motor 26 and pump 28. Pump 28 receives fuel from tank 18 through fuel connector 30 and pumps the fuel through inlet line 32 to the fuel inlet of reel assembly 10. Motor 26 connects through motor shaft 34 to appropriate gearing for controlling the rotation of reel assembly 10.

Reel assembly 10 is mounted within pod 12 by vertical mounting brackets 36, 37 and 38. The reel assembly is accessible through an access door shown in phantom at 40 to enable the reel assembly to be serviced or replaced as necessary.

Figure 2:
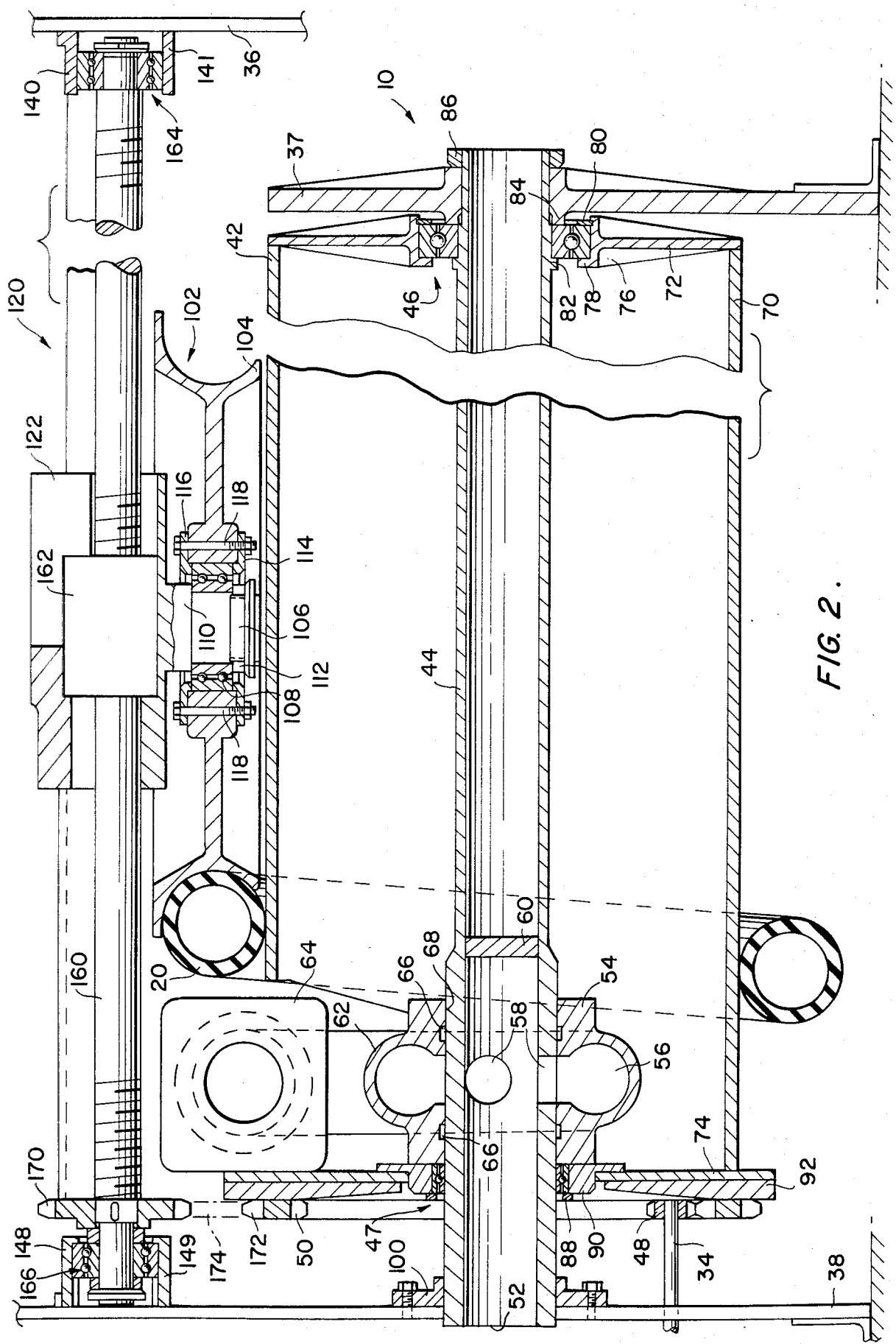
FIG. 2 is a longitudinal sectional view of a hose reel assembly according to the present invention.

FIG. 2 shows the reel assembly 10 in greater detail. As seen in FIGS. 1 and 2, reel assembly 10 includes a drum 42 which has a cylindrical outer surface to receive hose 20 when the hose is wrapped around the drum. Drum 42 is mounted on a stationary shaft 44 by bearings 46 and 47 so that the drum can rotate freely on shaft 44 to wind or unwind hose 20. Drum 42 is rotated by motor 26 through shaft 34 which contains a pinion gear 48 which meshes with an internally toothed ring gear 50 mounted to an end surface of drum 42. Accordingly, when shaft 34 rotates, drum 42 rotates also with the direction of rotation of drum 42 being controlled by the direction of rotation of motor shaft 34. Naturally, other gearing arrangements could be used to effect rotation of drum 42, the drive arrangement for drum 42 not being a critical element of the present invention.

Stationary shaft 44 is hollow in the center and contains an inlet end 52 which connects to inlet hose 32 for receiving fuel to be supplied through hose 20 to an aircraft being refueled. In order to pass the fuel from inlet 52 to hose 20, a rotary coupling or skroll 54 is mounted to the interior of drum 42. Skroll 54 contains an open receiving cavity 56 which communicates with the hollow interior of shaft 44 through one or more openings 58 formed through the wall of shaft 44. A plug 60 is contained in shaft 44 and closes off the internal opening of that shaft after the position of openings 58.

Collection opening 56 extends around the entire outer periphery of shaft 44 and communicates with tube 62 at the end of which a coupling 64 is mounted. Coupling 64 connects tube 62 to the inlet end of hose 20. A pair of seals 66 are contained on an inner surface 68 of skroll 54 and engage the outer periphery of shaft 44 so as to seal off collection opening 56 against shaft 44.

In operation, skroll 54, tube 62 and coupling 64 rotate with drum 42 about shaft 44 with seals 66 ensuring that there will be no leakage of fluid. The fuel to be dispensed enters through inlet end 52 passes through openings 54 and tube 62 into hose 20 through coupling 64.

Certain details of construction of the drum 42 are shown in FIG. 2. Drum 42 can be formed entirely of suitable metal components which are welded or bolted together as desired. For example, outer cylindrical wall 70 of drum 42 can be welded to end walls 72 and 74. End wall 72 can include gussets 76 for strength and is itself mounted on the outer race of bearing 46 by being positioned between a boss 78 and a C-ring 80. The inner race of bearing 46 is positioned between a boss 82 formed on the outer periphery of shaft 44 and a boss 84 formed on the inner surface of bracket 37. Tension is applied against the inner race of bearing 46 by a nut 86 which is mounted to the end of shaft 44.

The inner race of bearing 47 can be press fit onto shaft 44 and the outer race can be held between boss 88 of mounting member 90 and an outer surface of skroll 54. Mounting member 90 can be bolted to skroll 54 by a plurality of bolts (not shown). Mounting member 90 itself can be welded or bolted to end wall 74 of drum 42. A strengthening plate 92 is then bolted or welded to end wall 74.

The inlet end 52 of shaft 44 is connected to bracket 38 by mounting flange 100 which is bolted to the bracket 38. The opposite end of shaft 44 is held to mounting bracket 37 by nut 86, as discussed above.

The details of the construction are set forth here for purposes of illustrating the invention only. Clearly, the present invention can contain numerous other construction details.

In order to properly position hose 20 on drum 42 when the hose is being wound or unwound, a sheave 102, shown in FIG. 2, is positioned adjacent the outer surface of drum 42. Sheave 102 has a recessed outer surface 104 which is a part hemispherical recess having a radius of curvature equal to that of the outer surface of hose 20 so that hose 20 will fit conveniently within the recess. Also, the radius of curvature of recess 104 is such that an extension of the recess contacts the outer surface of drum 42 tangentially so that a portion of hose 20 resting on drum 42 can also be received in recess 104.

Sheave 102 can pivot about a shaft 106 by use of bearing 108. The inner race of bearing 108 is held on shaft 106 by abutting against boss 110 on one side and abutting against nut 112 on the other side. Nut 112 is threadedly received on the end of shaft 106. The outer race of bearing 108 is received between mounting flanges 114 and 116 which are also received on opposite sides of sheave 104 and held in place by bolts 118.

As can be understood from FIGS. 1 and 2, sheave 104 functions to position hose 20 properly on drum 42 and also serves to provide a smooth transition surface for bending hose 20 from a direction transverse to the axis of drum 42 to a direction axial of drum 42.

In order to operate effectively, sheave 104 must be moved along the axial length of drum 42 during a winding or unwinding process. To accomplish this function, shaft 106 is mounted to a slide structure 120. Slide 120 is shown most clearly in FIGS. 2 and 3 and includes a carriage 122 of which shaft 106 forms an integral part. Shaft 106 is formed in the middle of carriage 122 and a pair of through openings 124 and 126 are formed on opposite sides of shaft 106 and receive alignment shafts 128 and 130, respectively. A ball bushing 132 is mounted in opening 126 and a pair of similar bushings 132 are mounted in opening 124 and separated by spacer 134. Bushings 132 enable carriage 122 to slide smoothly along shafts 128 and 130 in a direction axially of drum 42.

One end of each shaft 128, 130 is connected to bracket 36 by the use of a cap 140 which bolts onto a lower flange 141 by the use of bolts 142. Set screws 143 and 144 are used to position shafts 128 and 130, respectively, between cap 140 and flange 141.

In a similar manner, the opposite end of each shaft 128, 130 is attached to bracket 38 by the use of a cap 148 which bolts onto a flange 149 by the use of bolts 150. Flange 149 is connected to bracket 38. Set screws 152 and 154 are used to ensure proper alignment of shafts 128 and 130, respectively.

To control movement of carriage 122 along shafts 128 and 130, a threaded screw shaft 160 is mounted between and parallel to guide shafts 128 and 130. Screw shaft 160 is received in a roller thread ball nut 162 which is mounted on carriage 122 for movement therewith. Accordingly, as shaft 160 rotates, ball nut 162 will move along the shaft in one direction or the other depending on the direction of shaft rotation and move carriage and sheave 104 with it.

Screw shaft 160 is mounted on one end to bracket 36 through bearing 164 which is received between flange 141 attached to bracket 36 and cap 140. The opposite end of shaft 160 is received within a bearing 166 which is mounted between flange 149 and cap 148 on bracket 38. It should be noted that shafts 128 and 130 as well as screw shaft 160 must extend beyond one end of drum 42 in order to permit one side of sheave 104 to be positioned above all points on the surface of drum 42. For this reason, bracket 36 is shown in a position spaced from the end of mounting bracket 37 which mounts the end of drum 42.

A sprocket wheel 170 is mounted to the end of screw shaft 60 adjacent mounting bracket 38. Sprocket wheel 170 is aligned with ring gear 50. Ring gear 50 is also formed with sprockets 172 on its outer surface. A chain 174 (shown in phantom) connects sprocket teeth 172 to sprocket 170 so that drum 42 and screw shaft 160 turn synchronously. As can be appreciated, the thread size on shaft 160 must be adjusted so that with each turn of drum 42, roller nut 162 moves along shaft 160 by a distance equal to the outside diameter of hose 120 so as to be sure to enable sheave 104 to position each turn of hose 120 directly adjacent the last turn or remove each turn of hose from its position adjacent the next succeeding turn. With the thread of shaft 160 so formed, hose 120 can easily be wrapped and unwrapped from drum 42 by simply rotating drum 42 by motor shaft 34 in the desired direction.

In place of sprocket 170, teeth 172 and chain 174, meshing gear teeth could easily be used. In this case, sprockets 170 and 172 would be replaced by meshing gears attached, respectively, to drum 42 and shaft 160.

As shown in FIG. 1, a bushing 180 can be inserted into bracket 36 and hose 20 can be threaded through bushing 180 to align it in the axial direction relative to drum 42.

In operation, when it is desired to feed hose 20 out of pod 12, drum 42 is rotated by motor 26 through motor shaft 34 in the unwind direction. Hose 20 is extended from pod 12 in a conventional manner and, as the hose is fed out from the pod, it changes direction from being transverse of the axis of drum 42 to being aligned with the axis of drum 42 by its contact with sheave 102. As drum 42 rotates, sheave 102 rotates above shaft 106 and shaft 106 moves along the drum periphery in synchronism with the drum rotation such that each time drum 42 rotates one complete turn, shaft 106 moves by an amount equal to the outside diameter of hose 20. Hose 20 is continued to be fed out in this manner until the desired length of hose extends from pod 12. The hose is then connected to an aircraft to be refueled in a conventional manner and pump 28 is actuated to feed fuel from tank 18 through inlet line 32 and skroll 54 into the inlet of hose 20. After the refueling operation is complete, the direction of rotation of drum 42 is reversed thus causing the hose 20 to be rewound. During rewinding, sheave 102 rotates about shaft 106 and places hose 20 in its proper position on drum 42 as well as provides a smooth transition curve for hose 20 as it changes from the axial to transverse directions relative to drum 42. As carriage 122 moves along threaded shaft 160, sheave 102 ensures that each wrap of hose 20 around drum 42 is positioned directly adjacent the next wrap. In this manner, the hose is efficiently rewound onto drum 42 without any of the hose overlapping prior hose windings thereby ensuring that the hose will not be crushed by additional wrappings.

As can be understood from the foregoing and seen in FIG. 1, by use of the reel system 10 of the present invention including sheave 102, hose 20 can be ejected from pod 12 in the axial direction of drum 42. Accordingly, the axis of drum 42 can be aligned with the longitudinal axis of pod 12 thereby enabling the pod 12 to be produced with a relatively small lateral dimension which is dictated by the diameter of drum 42. Also, the basic mechanism for rotating drum 42 is relatively simple as is the mechanism including sheave 104 for ensuring that the hose is properly wrapped onto drum 42. Accordingly, the entire reel mechanism 10 for any particular application can be designed, stress analyzed and built relatively simply thus holding down the cost of manufacture.

The foregoing description is set forth for the purpose of illustrating the present invention but is not considered to limit the scope thereof in any way. Clearly, numerous additions, size changes and other modifications can be made to the invention without departing from the scope thereof as set forth in the appended claims.

What is claimed is:

1. A system for in-flight refueling of aircraft, comprising:
   an elongated refueling pod;
   means for connecting said pod to an aircraft;
   a supply hose having an inlet end and an outlet end;
   a drum mounted for rotation in said pod about a central axis such that said drum axis extends along the longitudinal direction of said pod, said drum having a substantially smooth surface for receiving said supply hose, said inlet end being connected to said drum;

means for rotating said drum for wrapping said supply hose around said outer surface, said rotating means being positioned at an axial end of said drum and contained within said pod;

feed means connected for operation in synchronism with said rotating means for feeding said supply hose axially of said drum toward or away from said drum in accordance with the direction of rotation of said drum, and causing only a single wrap of said supply hose to be positioned on said drum, said feed means including a sheave having an axis of rotation perpendicular to the axis of said drum, said hose being wrapped around a portion of said sheave such that said sheave changes the direction of said hose from transverse of said drum to axially of said drum;

means for supporting said sheave and moving said sheave axis axially of said drum in response to rotation of said drum, said supporting and moving means comprising a carriage having bearing means rotatably mounting said sheave such that said sheave axis is perpendicular to said drum axis; screw threads formed in said carriage; a threaded shaft extending axially of said drum and received in said screw threads for moving carriage and said sheave axially of said drum, means for rotating said threaded shaft in synchronism with said drum; and, a pair of support members positioned on opposite sides of said threaded shaft, said support members slideably engaging said carriage and extending axially of said drum for inhibiting twisting of said carriage as it moves along said drum; and a hose guide member mounted to support said hose in substantially the same plane as said sheave as said hose comes off said sheave.

* * * * *